United States Patent

Tojo et al.

[11] Patent Number: 5,996,554
[45] Date of Patent: Dec. 7, 1999

[54] THROTTLE VALVE CONTROL DEVICE

[75] Inventors: Eiichi Tojo, Anjo; Hideki Kato, Toyohashi; Hazime Akado, Anjo; Hiromitsu Ohnishi, Nagoya; Yuichiro Miura, Anjo; Keiichi Okazaki, Ichinomiya, all of Japan

[73] Assignee: Denso Corporation, Kariya, Japan

[21] Appl. No.: 09/022,488

[22] Filed: Feb. 12, 1998

[30] Foreign Application Priority Data

Feb. 13, 1997 [JP] Japan .................................. 9-028753
Jan. 8, 1998 [JP] Japan ................................. 10-002448

[51] Int. Cl.⁶ ...................................................... F02D 9/08
[52] U.S. Cl. ............... 123/399; 251/129.09; 251/129.11; 310/38; 335/229
[58] Field of Search ............................. 123/339, 25, 361, 123/399; 251/129.09, 129.11, 129.12, 129.13; 310/36, 38, 156; 335/229

[56] References Cited

U.S. PATENT DOCUMENTS

| 3,644,763 | 2/1972 | Skrobisch | 310/36 |
|---|---|---|---|
| 4,460,859 | 7/1984 | Remus et al. | 318/696 |
| 4,491,815 | 1/1985 | Idogaki et al. | 335/229 |
| 4,724,811 | 2/1988 | Maisch | 123/361 |
| 4,850,322 | 7/1989 | Uthoff et al. | 123/399 |
| 5,016,588 | 5/1991 | Pagdin et al. | 123/399 |
| 5,287,835 | 2/1994 | Fiorenza, II et al. | 123/352 |
| 5,334,893 | 8/1994 | Oudet et al. | 310/38 |

FOREIGN PATENT DOCUMENTS

| 52-153109 | 12/1977 | Japan . |
|---|---|---|
| 60-43060 | 3/1985 | Japan . |
| 63-62979 | 3/1988 | Japan . |
| 63-146470 | 9/1988 | Japan . |
| 3-82348 | 4/1991 | Japan . |
| 5-284714 | 10/1993 | Japan . |
| 6-36380 | 5/1994 | Japan . |
| 6-253516 | 9/1994 | Japan . |
| 8-126289 | 5/1996 | Japan . |
| 9-298864 | 11/1997 | Japan . |

*Primary Examiner*—Tony M. Argenbright
*Attorney, Agent, or Firm*—Pillsbury Madison & Sutro, LLP

[57] ABSTRACT

A throttle valve control device is composed of a stator core with a solenoid and a rotor carrying a throttle valve. The rotor has a pair of poles which is composed of one or a plurality of rare-earth-metal permanent magnets magnetized in the radial thickness direction. The stator core has an inner periphery sorounding the rotor, and the inner periphery is smooth with no slot so that uniform distribution of magnetic flux can be formed in the inner periphery, thereby reducing the detent torque.

24 Claims, 6 Drawing Sheets

THROTTLE VALVE CONTROL DEVICE

CROSS REFERENCE TO RELATED APPLICATION

The present application is based on and claims priority from Japanese Patent Applications Hei 9-28753 filed on Feb. 13, 1997, and Hei 10-2448 filed on Jan. 8, 1998, the contents of which are incorporated herein by reference.

BACKGROUND OF THE INVENTION

1. Field of the Invention

The present invention relates to a throttle valve control device for controlling an air-intake passage.

2. Related Art

U.S. Pat. No. 5,287,835 discloses a throttle valve control device for controlling an air-intake passage in which the throttle valve is driven by a torque motor. In order to increase the response speed of the throttle valve, a return spring for biasing the throttle valve in one direction is omitted.

A drawing of U.S. Pat. No. 5,287,835, shows a stator core of an actuator with no slot on the inner periphery surrounding a rotor. However, the drawing is only a diagrammatical view and there is no description on the inner periphery of the stator core in the specification. A stator core illustrated in another drawing has a separated N-pole stator section and an S-pole stator section, and slots or cut portions are formed between two sections. If the rotor is equipped with a permanent magnet made of rare-earth metal such as neodyum, samarium or cobalt, distribution of magnetic-flux density in the stator becomes more uneven than the distribution of magnet-flux density caused by the rotor equipped with a ferrite magnet. Accordingly, a large detent torque is applied to the rotor when the driving coil is turned off.

In an actuator which has a return spring for returning the rotor to the fully closed position to prevent the throttle valve from opening if the current control device of the torque motor becomes out of order, a large spring force is necessary to return the rotor to the fully closed position against the detent torque if there is a slot on the inner periphery of the stator surrounding the rotor. That is, large electro-magnetic force and, accordingly, a large-sized torque motor are necessary to drive the throttle valve against the spring force.

Although it is desired that the permanent magnet for magnetic poles on the rotor is magnetized in the radial directions, cracks may be formed during the step of cooling the permanent magnet if the magnetic poles of the permanent magnet are formed of a large number of sintered radially-magnetized particles. Thus, the yield rate decreases and the production cost increases.

SUMMARY OF THE INVENTION

A main object of the present invention is to provide a simple and compact throttle valve control device.

Another object of the present invention is to provide a throttle valve control device which controls the throttle position accurately.

Another object of the present invention is to provide a throttle valve control device which can be manufactured easily at low cost.

According to the invention, a stator core of an electromagnetic driving unit is arranged to have a smooth inner periphery with no slot, so that unevenness in the distribution of the magnetic flux density in the stator core can be reduced. Accordingly, the detent torque applied to the rotor when the rotor is rotated without current supplied to the solenoid can be eliminated. Thus, the electro-magnetic force to drive the rotor can be reduced. Because the detent torque can be eliminated, the electromagnetic force of the throttle valve control device can be reduced. Therefore, the size of the electromagnetic drive unit and, finally, the throttle valve control device can be made small.

In the throttle valve control device according to another aspect of the invention, a permanent magnet member disposed on the outer periphery of the rotor is magnetized in the radial directions from the center of the rotor. Accordingly, unevenness in the torque applied to the rotor can be reduced irrespective of the rotational position of the rotor. As a result, the throttle position can be controlled accurately irrespective of the rotational position of the rotor so that the intake air can be controlled accurately.

In the throttle valve control device according to another aspect of the invention, a plurality of permanent magnets magnetized in the same direction are disposed on the outer periphery of the rotor to provide magnetic poles magnetized in the radial directions. Therefore, the permanent magnets can be manufactured easily without cracks at a high yield rate and low cost.

In the throttle valve control device according to another aspect of the invention, the inner periphery surrounding the rotor is formed in an area other than the area extending from the width of portions of the solenoid in engagement with the portions of the stator core. Therefore, stress of the engagement portions does not affect the inner periphery of the stator core, and the air gap between the inner periphery of the stator core and the rotor can be kept uniform. As a result, the torque applied to the rotor can be regulated accurately to ensure smooth rotation of the rotor, high accuracy of the throttle valve position and accurate control of the intake air.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

A throttle valve control device according to a first embodiment of the present invention is described with reference to FIGS. 1, 2 and 3. The throttle valve control device 10 is composed of throttle body 11, throttle valve 13, a valve shaft 12, rotation position sensor 30 and electro-magnetic torque motor 40 which controls position of throttle valve 13 according to position of an accelerator of a vehicle.

Throttle body 11 rotatably supports valve shaft 12 via bearings 15 and 16. Throttle valve 13 has a circular plate and is fixed to valve shaft 12 by screws 14. When throttle valve 13 turns about valve shaft 12, passage area of air intake passage 11a defined by the inner periphery of throttle body 11 changes, so that an amount of the intake air can be controlled.

Throttle lever 21 is press-fitted to an end of valve shaft 12 so that throttle lever 21 can rotate with valve shaft 12. Stopper screw 22 fixes the full-close position of throttle valve 13 by engaging therewith. The full-close position of throttle valve 13 can be adjusted by turning screw 22.

Rotation position sensor 30 is disposed at the side of throttle body 11 on the same end of the valve shaft 12. Rotation position sensor 30 is composed of contact member 31, resistance board 32 with the resistor member coated thereon and housing 33. Contact member 31 is press-fitted to valve shaft 12 to rotate together therewith. Resistance board 32 is fixed to housing 33 so that contact member 31 can slide on the resistor member of resistance board 32. Five volts-constant voltage is applied across the resistor member of resistance board 32. When the relative position between the resistor member and contact member 31 changes, the output voltage of rotation position sensor 30 changes. The output voltage is applied to an engine control unit (ECU, not shown) from rotation position sensor 30 to detect the position of throttle valve 13.

Electro-magnetic torque motor 40 is composed of rotor 41, stator core 45 and a pair of solenoid 50 and 55 and is disposed at the side of throttle body 11 on the other end of valve shaft 12.

Rotor 41 is composed of cylindrical rotor core 42 into which valve shaft 12 is press-fitted and permanent magnets 43 and 44. Rotor 41 is surrounded by inner periphery 45a of stator core 45. Rotor core 42 is made of magnetic material and is press-fitted to the other end of valve shaft 12. A pair of permanent magnets 43 and 44 is arc-shaped and bonded to the outer periphery of rotor core 42 at equal intervals. Throttle valve 13 can rotate within an angle of 90°. Accordingly, the arc length of the permanent magnets 43 and 44 is arranged enough to rotate rotor 41 within the rotation angle. Permanent magnets 43 and 44 are made of rare-earth metal such as a high neodymium or samarium-cobalt alloy.

Stator core 45 is made of a plurality of thin magnetic sheets laminated in the axial direction of valve shaft 12 and has inner periphery 45a which surrounds rotor 41. The inner periphery 45a of stator core 45 that surrounds rotor 41 is even and has no slot thereon. Solenoids 50 and 55 have coils 52 and 57 which are wound around cores 51 and 56 respectively and have projections 55a fitted into grooves 45c of stator core 45. Coils 52 and 57 are supplied with control current from pins of connector 60.

Figure 3A:
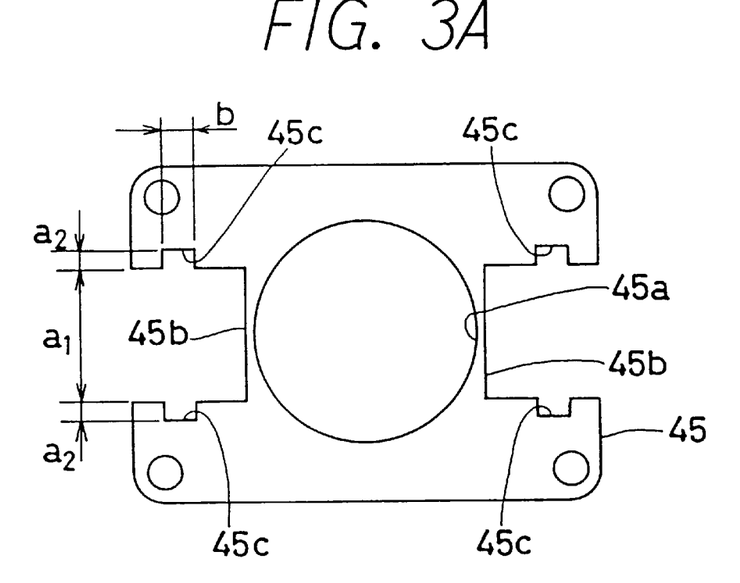
FIG. 3A is a front view illustrating a stator core.
Figure 3B:
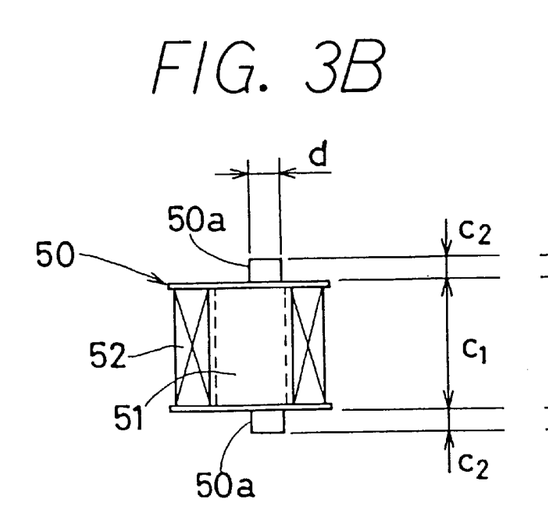
FIG. 3B and FIG. 3C are front views illustrating solenoids.
Figure 3C:
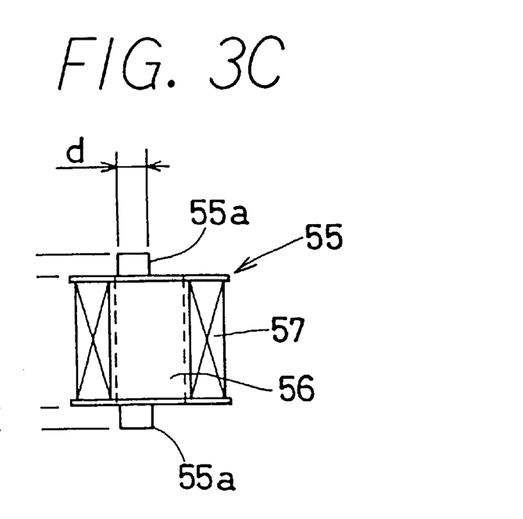

Stator core 45 and solenoids 50 and 55 are shown in FIG. 3 in more detail. Each of solenoids 50 and 55 is inserted to one of the rectangular concave portions 45b of stator core 45 in the direction from this side of FIG. 3 to the far side of it or from the far side thereof to this side thereof.

Concave portions 45b are formed at opposite portions of stator core 45 radially outside of inner periphery 45a as shown in FIG. 3A. A pair of grooves 45c is formed on the opposite wall of each of concave portions 45b. A pair of projections 50a and 55a is formed on the opposite sides of solenoids 50 and 55 as shown in FIGS. 3B and 3C.

Distance a1 between opposite surfaces of each of concave portions 45b is longer than length c1 of solenoids 50 and 55, and depth a2 of grooves 45c is larger than height c2 of projection 50a and 55a. On the other hand, width b of grooves 45c is narrower than width d of projection 50a and 55a. When solenoids 50 and 55 are press-fitted into grooves 45c, projections 50a and 55a are tightly held by grooves 45c. Solenoids 50 and 55 are not held by any member other than grooves 45c. Inner periphery 45a is positioned in an area other than the area located on the extension of projections 50a and 55a.

Thus, when the projections 50a and 55a are press-fitted into grooves 45c, projections 50a and 55a do not expand or deform inner periphery 45a, so that a uniform air gap can be formed between the inner periphery 45a of stator core 45 and permanent magnets 43 and 44. Accordingly, the torque applied to rotor 41 is kept constant and rotor 41 can rotate smoothly. With solenoid 50 and 55 being press-fitted into stator core 45, stator core 45 is provided with a smooth inner surface surrounding rotor 41 without any slot. As a result, the distribution of the magnetic flux density in stator core 45 becomes uniform so that the detent torque applied to rotor 41 during the rotation can be eliminated.

Permanent magnets 43 and 44 are magnetized in the radial directions from the center. When coils 52 and 57 are energized, the torque generated by magnetic force of coils 52 and 57 and permanent magnets 43 and 44 are applied to rotor 41. The characteristic curve of the torque applied to rotor 41 is not a sine wave that reduces the torque on the extreme sides of the area of the rotation but a rectangular wave that equalizes the torque irrespective of the position of throttle valve 13. Thus, the position of throttle valve 13 can be controlled with high accuracy.

Figure 1:
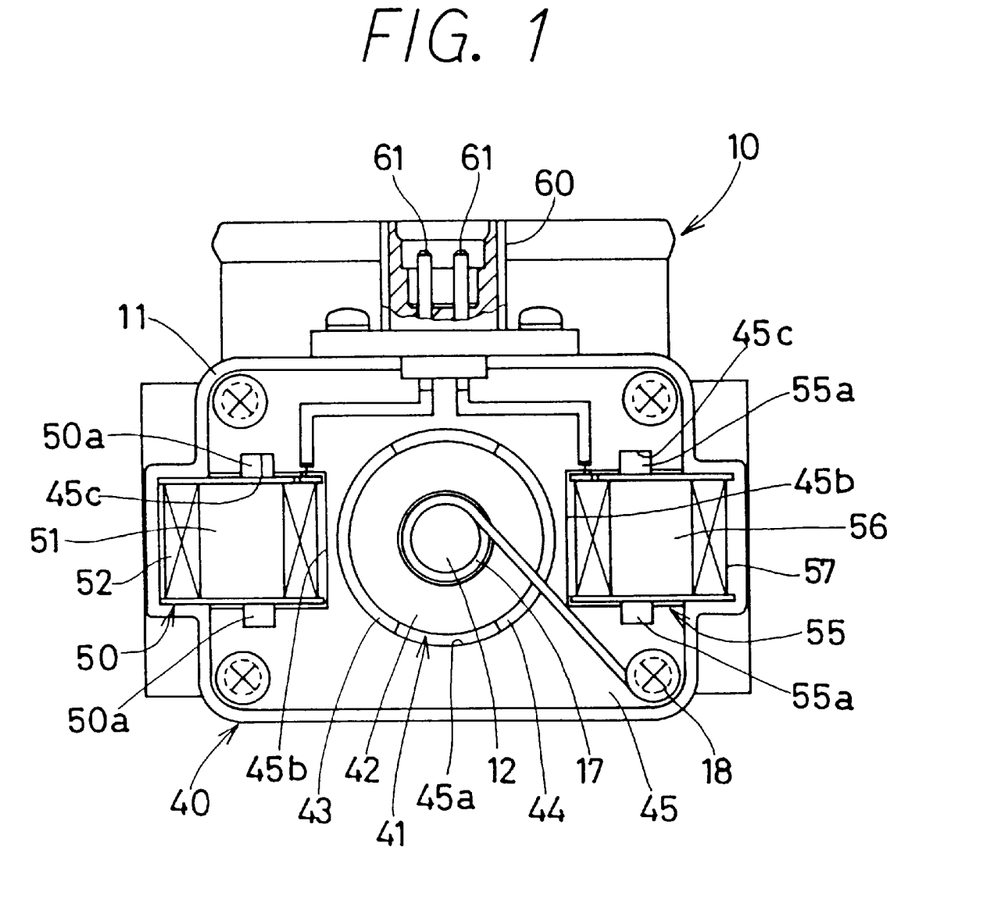
FIG. 1 is a front view illustrating a throttle valve control device without a cover according to a first embodiment of the present invention.
Figure 2:
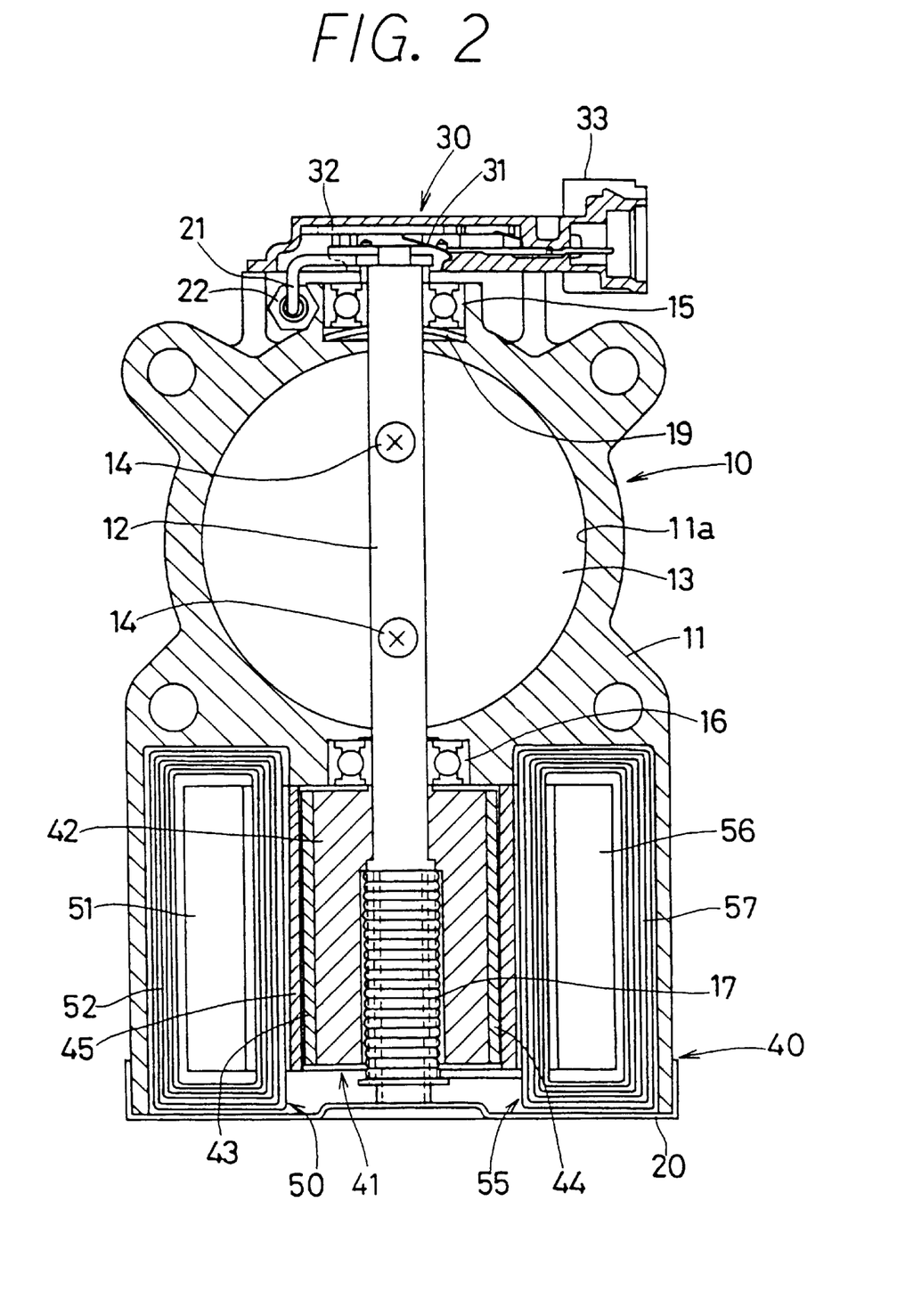
FIG. 2 is a longitudinal cross-sectional view illustrating the first embodiment.

An end of return spring 17 shown in FIGS. 1 and 2 is fixed to rotor core 42 and the other end thereof is fixed to the axial end surface of stator core 45 by screw 18, thereby biasing throttle valve 13 to close the passage. Return spring 17 has a main spiral coil portion disposed in cylindrical rotor core 42. Because rotor core 42 as well as return spring 17 is disposed in stator core 45, the size of torque motor 40 is decided by the size of stator core 45. That is, return spring 17 does not increase the size very much.

Wave washer 19 biases valve shaft 12 in an axial direction to prevent the same from shifting in the axial direction due to vibration of an engine in operation. Accordingly, the position of contact member 31 relative to resistance board 32 does not change, so that the signal indicating position of throttle valve 13 may not change and ware of the resistor member or contact member 31 due to abnormal friction therebetween can be prevented.

The operation of throttle valve control device 10 is described hereafter.

(1) Normal Running Modes:

The normal running mode includes running under ISC (idle speed control) and cruise control as well as ordinary running. The position of the throttle valve 13 is calculated by an ECU (not shown) according to engine conditions including the accelerator position and rotation speed of the engine so that control current is supplied to coils 52 and 57 according to the calculated result.

Because the rotating torque applied to rotor 41 when coils 52 and 57 are energized is larger than the biasing force of return spring 17, rotor 41 rotates against the biasing force of return spring 17.

The position of throttle valve 13 rotated by rotor 41 is detected by rotation position sensor 30 and fed back to the ECU, which controls the current supplied to coils 52 and 55. Thus, variation in the torque applied to rotor 41 due to temperature change or the like can be regulated by detecting the throttle valve position, and the throttle valve position can be controlled with high accuracy.

(2) Control in Failure:

If the target value of the position of throttle valve 13 is different from an actual position of throttle valve 13 as detected by rotation position sensor 30, it is decided that the throttle valve control of the ECU fails. Consequently, the ECU provides a signal to close throttle valve 13. Then throttle valve 13 is returned by return spring 17 to the full-close position, thereby preventing throttle valve 13 from moving to an abnormal position.

The ECU has a sub-ECU which always watches abnormal conditions of the ECU. When the ECU fails, the sub-ECU stops the control current supplied to coils 52 and 57. Thus, throttle valve 13 is returned to the full-close position by return spring 17 whenever the ECU fails.

(Second Embodiment)

Figure 4:
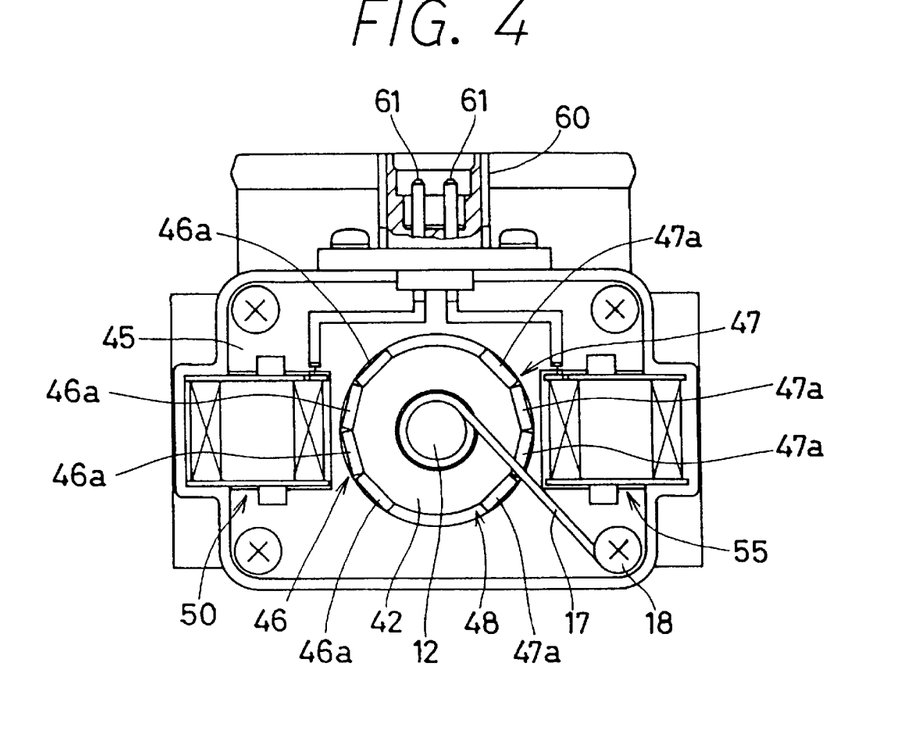
FIG. 4 is a view illustrating a throttle valve control device according to a second embodiment of the present invention.

A second embodiment of the present invention is described with reference to FIG. 4. Portions which are substantially the same as those of the first embodiment are denoted by the same reference numerals.

A pair of poles 46 and 47 is composed of four flat permanent magnets 46a and 47a, which are bonded to the outer periphery of rotor core 42. Permanent magnets 46a and 47a are made of rare-earth metal and disposed on the circumference of rotor core 42 as shown in FIG. 4 so that permanent magnets 46 and 47 are magnetized in the radial directions from the center of rotor 48.

The second embodiment having a plurality of permanent magnets 46a and 47a is arranged to have substantially the same construction as the first embodiment having a pair of permanent magnets magnetized in the radial directions. The flat magnets can be produced and magnetized easily.

If a large number of magnetized particles are sintered to form permanent magnets 43 and 44 used in the first embodiment that have arc-shaped outer surfaces, the thermal expansion thereof in the magnetized direction is different from the thermal expansion in the direction perpendicular to the magnetized direction. This may cause cracks in the permanent magnets when they are cooled after the step of sintering. Flat permanent magnets 46a and 47a used in this embodiment do not have the above stated problem. Accordingly, the yield rate of the permanent magnets becomes higher and the production cost thereof can be reduced.

(Third Embodiment)

Figure 5:
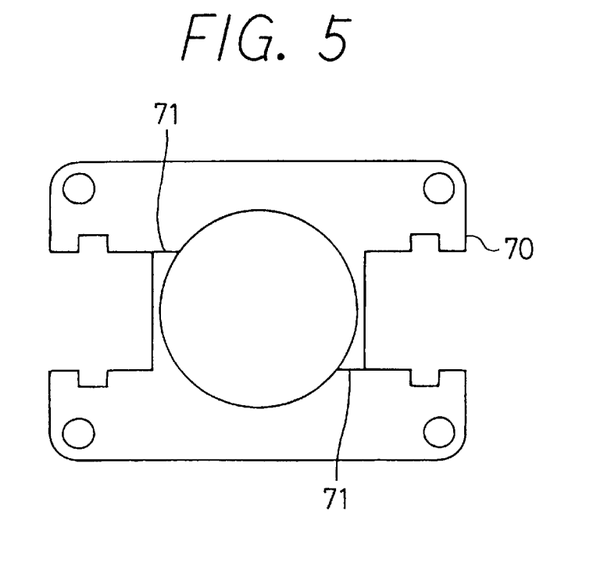
FIG. 5 is a front view illustrating the stator core according to a third embodiment of the present invention.

A divided stator core used in a third embodiment of the present invention is shown in FIG. 5. In the third embodiment, there are gaps 71 of about 0.1 mm caused by the production step between two pieces of stator core 70. However, it is negligibly small to generate the detent torque. Thus, the electromagnetic force torque necessary for driving the rotor can be reduced.

(Fourth Embodiment)

Figure 6:
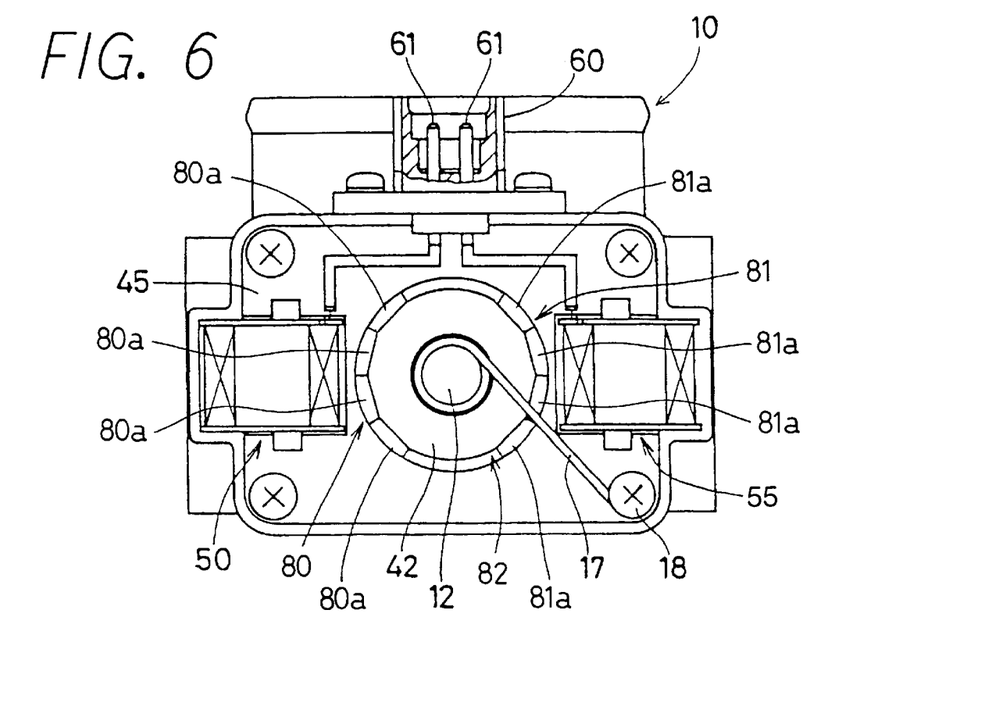
FIG. 6 is a view illustrating a throttle valve control device according to a fourth embodiment of the present invention.

A fourth embodiment of the present invention is described with reference to FIG. 6. Portions which are substantially the same as those of the first and second embodiments are denoted by the same reference numerals.

Magnetic poles 80 and 81 are respectively composed of four permanent magnets 80a and 81a. Each of permanent magnets 80a and 81a has flat surface at the side of rotor core 42 and a semi-cylindrical surface facing stator core 45, and is bonded to the outer periphery of rotor core 42. Permanent magnets 80a and 81a are made of rare-earth metal material, magnetized in the radial thickness direction and disposed to form the semi-cylindrical surfaces into an arc as shown in FIG. 6. As a result, two magnetic poles 80 and 81 are magnetized in the radial directions from the center of rotor 82.

The semi-cylindrical surfaces of permanent magnets used in the fourth embodiment render the air gap between permanent magnet 80a and 81a and the inner periphery of stator core 45 uniform, and the flat surfaces thereof render the machine works and assembling works such as bonding to be simple.

The outer surface of the permanent magnets used in the fourth embodiment can be shaped cylindrical by machining after trapezoidal or flat permanent magnets are bonded to the outer periphery of rotor core 42. In this case, the air gap between the permanent magnets and inner periphery of stator core 45 can be more uniform.

(Fifth Embodiment)

Figure 7:
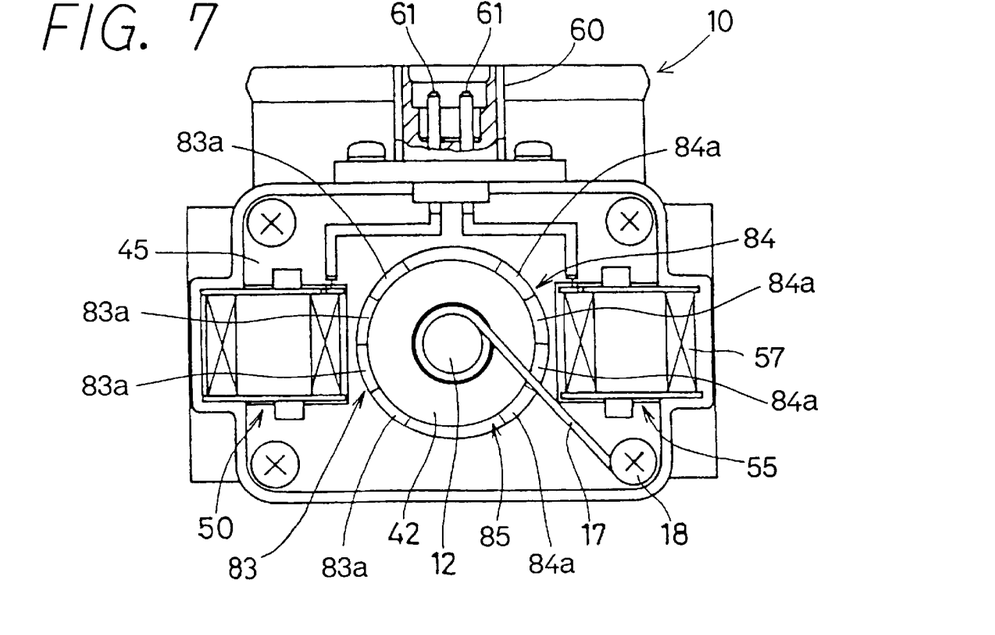
FIG. 7 is a view illustrating a throttle valve control device according to a fifth embodiment of the present invention.

A fifth embodiment of the present invention is described with reference to FIG. 7. The portions of the fifth embodiment which are substantially the same as those of the fourth embodiment are denoted by the same reference numerals.

Magnetic poles 83 and 84 are respectively composed of four permanent magnets 83a and 84a which are bonded to the outer periphery of rotor core 42. Each of permanent magnets 83a and 84a has a semi-cylindrical inner surface on the side of rotor core 42 and a semi-cylindrical outer surface facing the inner periphery of stator core 45, forming a semi-circular member. Permanent magnets 83a and 84a are made of rare earth metal and magnetized in the radial thickness direction. They are disposed to form an arc along the circumference of rotor core 42 as shown in FIG. 7. Thus, magnetic poles 83 and 84 are magnetized in the radial directions from the center of rotor 85.

The outer surface facing stator core 45 of permanent magnets 83a and 84a used in the fifth embodiment is semi-cylindrical, the air gap between permanent magnets 83a or 84a and the inner periphery of stator core 45 becomes uniform. Because the inner surface on the side of rotor core 42 is also semi-cylindrical, the volume of the permanent magnets can be reduced. This reduces magnetic material and the production cost.

(Sixth Embodiment)

Figure 8:
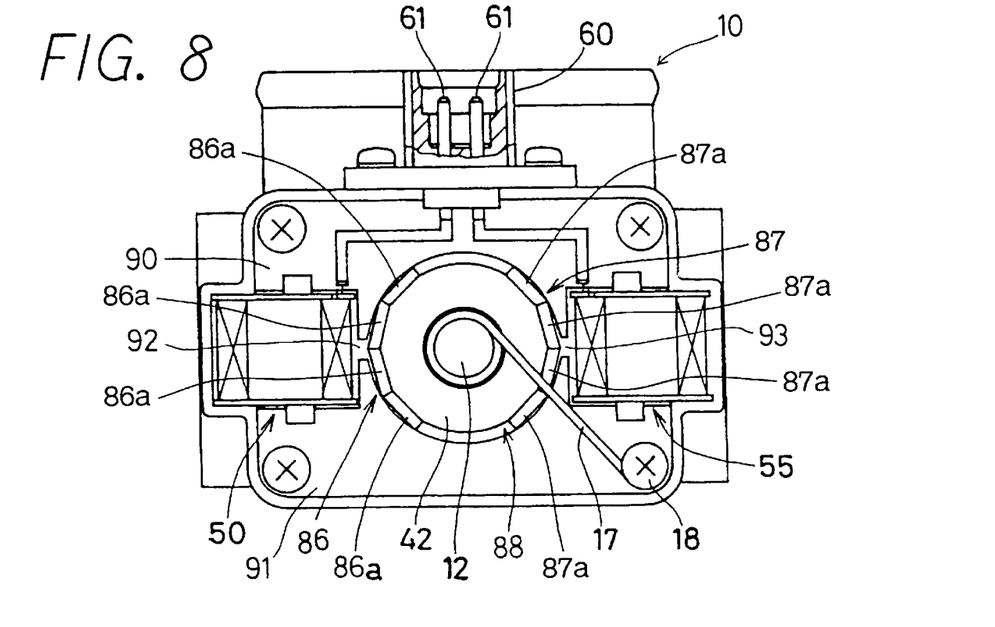
FIG. 8 is a view illustrating a throttle valve control device according to a sixth embodiment of the present invention.

A sixth embodiment of the present invention is described with reference to FIG. 8. The portions which are substantially the same as those of the second embodiment are denoted by the same reference numerals.

A pair of stator cores 90 and 91 is disposed to surround the outer periphery of rotor 88 which has two magnetic poles. Slots 92 and 93 are disposed at 180° apart, on opposite sides of rotor 88, thereby demarcating the magnetic paths of the stator core.

In the sixth embodiment, rotor 88 has two magnetic poles 86 and 87 which are composed of one-way-magnetized flat permanent magnets 86a and 87a respectively. Because it is easy to magnetize the flat magnets in one way, magnetic poles 86 and 87 can be provided easily at low production cost.

In the sixth embodiment, each of the permanent magnets has a trapezoidal cross-section as viewed from axially outside of rotor 88 so that permanent magnets 86a and 87a are lined up circumferentially in close contact with another in the respective magnetic poles of rotor 88. Accordingly, variation in the detent torque applied to rotor 88 is smaller than that of the second embodiment in which there are spaces between the permanent magnets on the rotor surface facing the inner periphery of the stator core as shown in FIG. 4.

(Seventh Embodiment)

Figure 9:
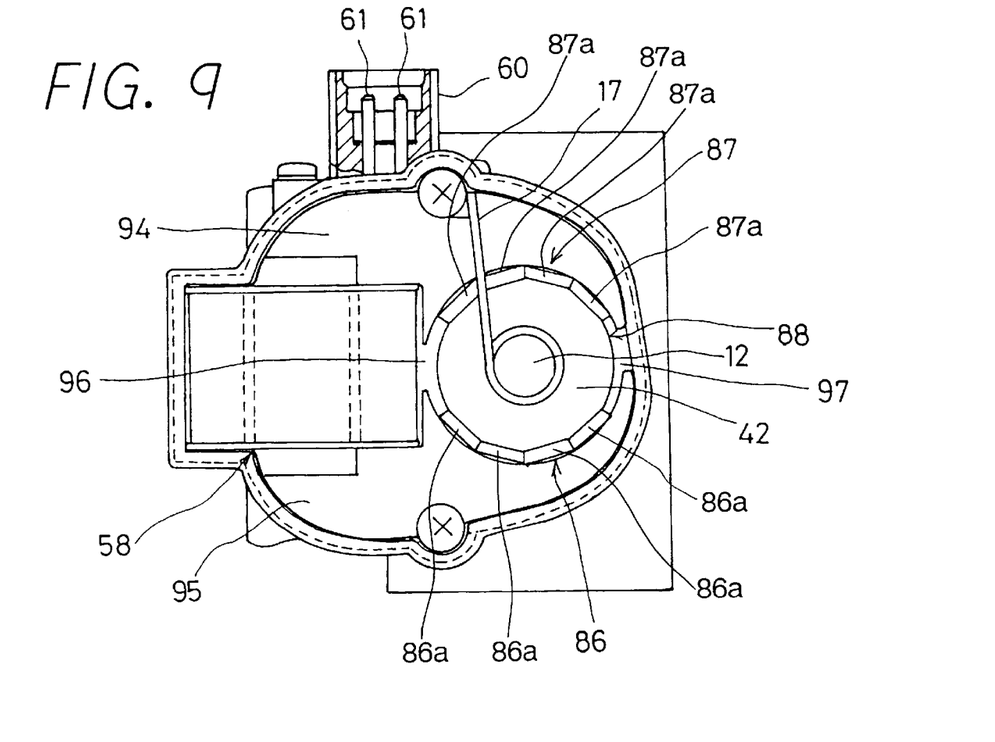
FIG. 9 is a view illustrating a throttle valve control device according to a seventh embodiment of the present invention.

A seventh embodiment of the present invention is described with reference to FIG. 9. A single solenoid 58 is used instead of a pair of solenoids 50 and 55 used in the first to sixth embodiments, which are provided to improve the response time. Therefore, the device can be made smaller at lower cost.

The seventh embodiment has a pair of stator cores 94 and 95 forming two poled-cores separated by two slots 96 and 97 when solenoid 58 is energized. Two slots 96 and 97 are disposed respectively at portions on opposite sides of rotor 42 with an angle shifted about a half pitch of one of permanent magnets 86a and 87a from 180°. A plurality of flat permanent magnets are disposed on the circumference of the rotor and the air gap increases at the middle surface of the flat permanent magnets, causing cyclic torque change related to the rotation position. In this embodiment, the maximum torque is applied to the rotor near the pair of slots. In order to cancel the maximum torque, the slots are positioned at an angle on opposite sides of the rotor about a half pitch of one of permanent magnets 86a and 87a shifted from 180°. Thus, the rotor can have uniform torque in the rotation area. The variations in the torque can be eliminated in this way even if the rotor has a plurality of permanent magnets disposed on the circumference of the rotor at a space between each of the permanent magnets.

In the above embodiments of the invention, return spring 17 returns the rotor to the full-close position if the operation fails. However, it is possible to omit return spring 17 and allow the rotor to rotate in both directions.

A cylindrical retainer cover can be provided to retain the permanent magnets on the rotor. If this cover is made of magnetic material, the cover is magnetized by the permanent magnets so that the air gap between the poles of the rotor and the inner periphery of the stator core can be made uniform.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A throttle valve control device including:

a throttle body having an air intake passage;

a valve member for controlling passage area of said air intake passage; and an electromagnetic drive unit for driving said valve member, said drive unit including a rotor having a pair of magnetic poles rotatating said valve member, a stator core having an inner periphery surrounding said rotor and a solenoid disposed on said stator core, wherein each of said magnetic poles includes a plurality of permanent magnets disposed on the circumference of said rotor and magnetized in radial directions from the center of said rotor.

2. A throttle valve control device as claimed in claim 1, wherein said permanent magnets are made of rare-earth metal.

3. A throttle valve control device as claimed in claim 1, wherein said inner periphery of said stator core is smooth and has no slot thereon.

4. A throttle valve control device as claimed in claim 1, wherein said drive unit further comprises a return spring disposed in said stator core to bias said rotor in one direction.

5. A throttle valve control device as claimed in claim 1, wherein said solenoid has a pair of first engagement portions at opposite ends thereof, said stator core has a pair of second engagement portions at portions thereof corresponding to said first engagement portions, said first engagement portions are in engagement with said second portions respectively, and said inner periphery of said stator core surrounding said rotor is disposed in an area other than the area extending from the width of said engagement portions in engagement with each other.

6. A throttle valve control device including:

a throttle body having an air intake passage;

a valve member for controlling passage area of said air intake passage; and an electromagnetic drive unit for driving said valve member, said drive unit being composed of a rotor having a plurality of magnetic poles rotating said valve member, a stator core having an inner periphery surrounding said rotor and a solenoid disposed on said stator core, wherein at least a portion of said magnetic poles comprises a plurality of permanent magnets.

7. A throttle valve control device as claimed in claim 6, wherein said permanent magnets are made of rare-earth metal.

8. A throttle valve control device as claimed in claim 6, wherein said permanent magnets are disposed on the circumference of said rotor.

9. A throttle valve control device as claimed in claim 6, wherein each of said permanent magnets is flat.

10. A throttle valve control device as claimed in claim 6, wherein each of said permanent magnets has an arc-shaped outer surface and flat inner surface.

11. A throttle valve control device as claimed in claim 6, wherein each of said permanent magnet has arc-shaped outer and inner surfaces.

12. A throttle valve control device as claimed in claim 6, wherein said inner periphery of said stator core has no slot.

13. A throttle valve control device comprising:

a throttle body having an air intake passage;

a valve member for controlling passage area of said air intake passage; and an electro-magnetic drive unit for rotating said valve member in a prescribed angle, said drive unit comprising a rotor having a pair of magnetic poles, a stator core having an inner periphery surrounding said rotor, and a solenoid disposed on said stator core, and each of said magnetic poles comprising a plurality of flat permanent magnets disposed side by side on the circumference of said rotor and magnetized in radial directions from the center of said rotor.

14. A throttle valve control device as claimed in claim 13, wherein
said permanent magnets are made of rare-earth metal.

15. A throttle valve control device as claimed in claim 13, wherein
said inner periphery of said stator core is smooth and has no slot thereon.

16. A throttle valve control device as claimed in claim 13, wherein
said drive unit further comprises a return spring disposed in said stator core to bias said rotor in one direction.

17. A throttle valve control device as claimed in claim 13, wherein
said solenoid has a pair of first engagement portions at opposite ends thereof,
said stator core has a pair of second engagement portions at portions thereof corresponding to said first engagement portions,
said first engagement portions are in engagement with said second portions respectively, and
said inner periphery of said stator core surrounding said rotor is disposed in an area other than the area extending from the width of said engagement portions in engagement with each other.

18. A throttle valve control device comprising:
a throttle body having an air intake passage;
a valve member for controlling passage area of said air intake passage; and
an electromagnetic drive unit for rotating said valve member in a prescribed area,
said drive unit comprising a rotor having a plurality of magnetic poles, a stator core having an inner periphery surrounding said rotor, and a solenoid disposed on said stator core, and
at least a portion of said magnetic poles comprising a plurality of flat permanent magnets disposed side by side on the circumference of said rotor and magnetized in radial directions from the center of said rotor.

19. A throttle valve control device as claimed in claim 18, wherein
said permanent magnets are made of rare-earth metal.

20. A throttle valve control device as claimed in claim 18, wherein
said permanent magnets are disposed on the circumference of said rotor.

21. A throttle valve control device as claimed in claim 18, wherein
each of said permanent magnets is flat.

22. A throttle valve control device as claimed in claim 18, wherein
each of said permanent magnets has an arc-shaped outer surface and flat inner surface.

23. A throttle valve control device as claimed in claim 18, wherein
each of said permanent magnet has arc-shaped outer and inner surfaces.

24. A throttle valve control device as claimed in claim 18, wherein
said inner periphery of said stator core has no slot.

* * * * *